April 26, 1949.    R. W. BRAUND    2,468,586
METHOD OF TREATING LOW GRADE IRON ORES
Filed July 3, 1944    2 Sheets-Sheet 1
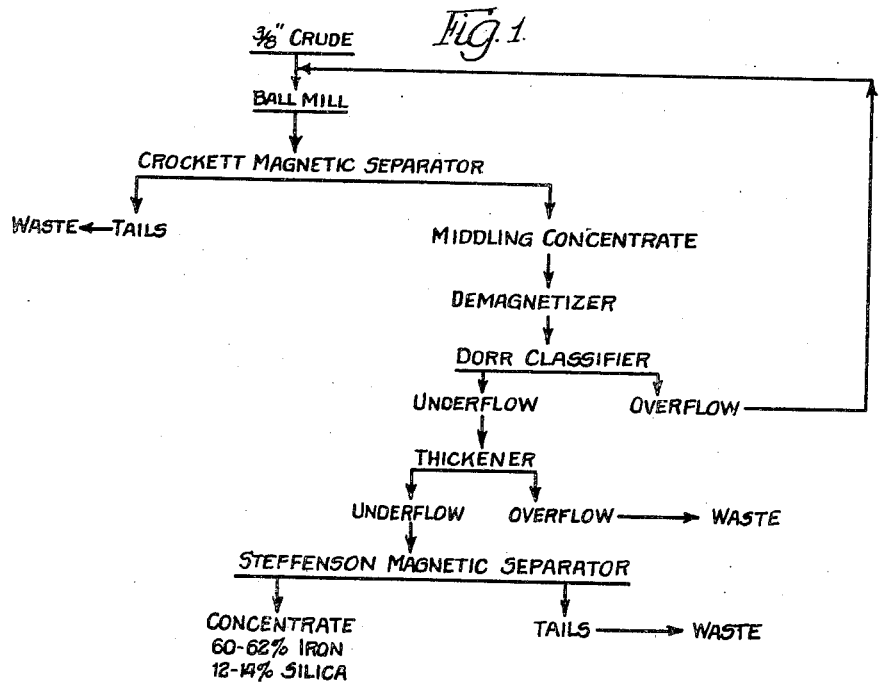
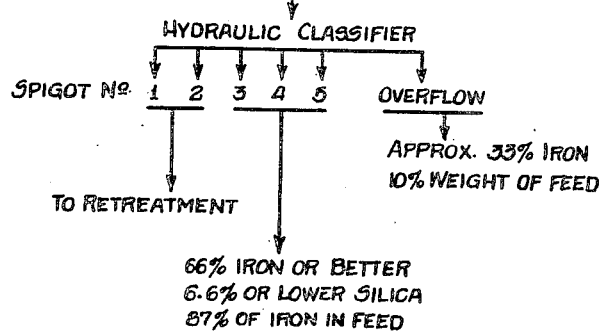
INVENTOR.
Robert W. Braund,
BY
Wilkinson, Huxley, Byron & Knight
attys.

April 26, 1949.   R. W. BRAUND   2,468,586
METHOD OF TREATING LOW GRADE IRON ORES
Filed July 3, 1944   2 Sheets-Sheet 2
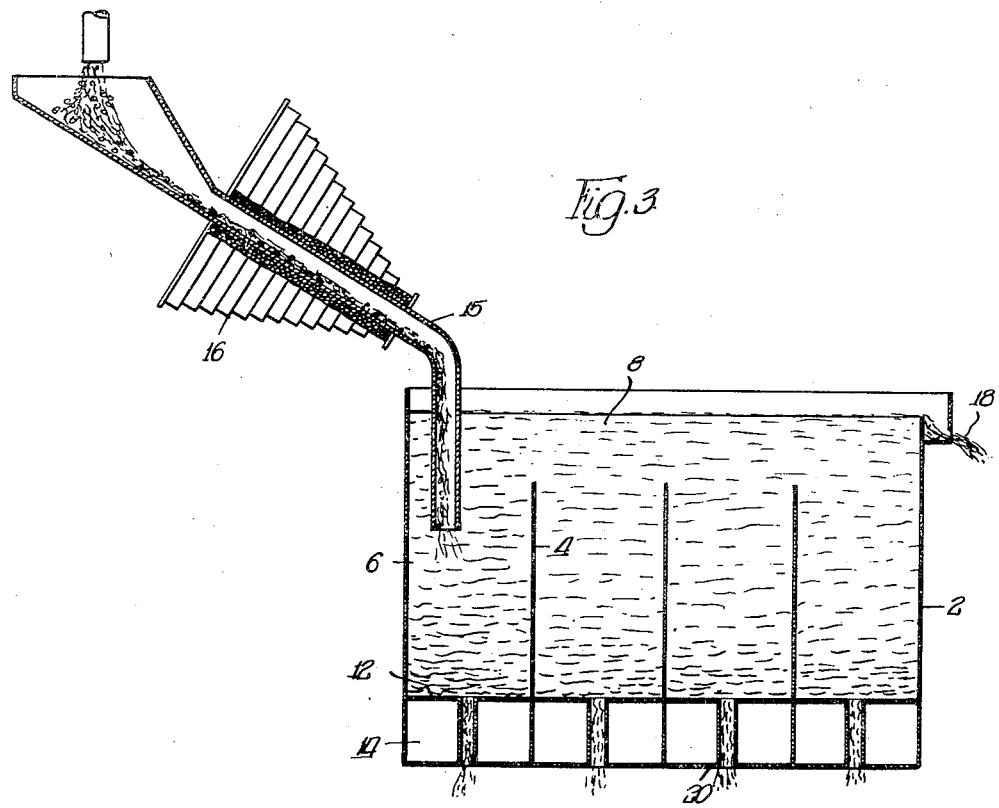
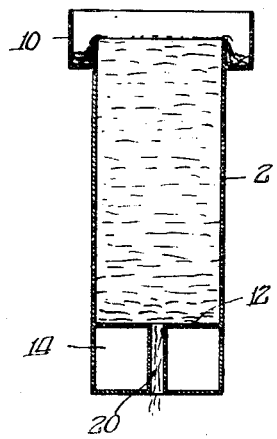
INVENTOR.
Robert W. Braund,
BY
Wilkinson Huxley Byron & Knight
Attys.

Patented Apr. 26, 1949

2,468,586

UNITED STATES PATENT OFFICE 2,468,586

METHOD OF TREATING LOW-GRADE IRON ORES

Robert W. Braund, Ishpeming, Mich., assignor to Inland Steel Company, Chicago, Ill., a corporation of Delaware Application July 3, 1944, Serial No. 543,249

4 Claims. (Cl. 209—39)

The present invention relates to a method of treating low grade iron ores, and particularly magnetic concentrates of said ores.

Among the objects of the present invention is to provide a novel process which makes it commercially practicable to use low grade iron ores as a source of material for open hearth and blast furnace feeds.

Another object of the present invention is to provide a novel method of processing magnetic iron concentrates on a commercial basis to produce a concentrate at low cost and in such a condition as to make it suitable for further metallurgical treatments.

The present invention has to do with low grade iron ores which are found in various places throughout the world in tremendous quantities and which have not been used as a source of iron because of the inability to provide an acceptable concentrate which could be used commercially.

These ores in many instances are silicious magnetites containing magnetite and minor amounts of hematite, martite, silica, and silicates. An illustrative typical analysis of such ores might include 32.00% total iron, 25.00% being magnetic iron and the balance being silica, alumina, magnesium, and the like, with the silica being by far the largest percentage of this balance.

Such an ore is considered a low grade ore as compared to other available sources and difficulty has been experienced in the past in concentrating such a low grade ore to produce a concentrate of relatively high iron content and of sufficiently low silica content to be usable for open hearth and blast furnace feeds in competition with currently available natural ores.

Such ores are characterized in part by the fact that some iron ore minerals unlock when the ore is ground so as to pass a 150 mesh screen. In other instances the unlocking may occur at coarser or finer screen sizes of relatively wide range. When iron ore is so treated, however, and magnetic means is resorted to to separate the particles rich in iron from the middlings containing large percentages of silica, a resulting concentrate is produced which assays about 60% iron and from 10 to 14% silica, which cannot be used commercially for furnace feeds or charges. Further attempts to increase the iron content and to decrease the silica content by finer grinding and subjecting the same to magnetic separation results in some increase in the percentage of iron obtained in the concentrate, but the increased grinding costs make it commercially impracticable to follow this procedure.

The ineffectiveness of these further grinding operations is due to the fact that the silica occurs as middling particles with almost every grain being made up of silica and small particles of magnetite. In the fine sizes in which these middling particles occur, it has been impossible to date to fraction them out magnetically. Furthermore, these middlings occur in the greatest amount in the coarser screen fractions of the magnetic concentrate. The finer ore, for example minus 325 mesh fractions, assay 68% iron or better, but if this magnetic concentrate is ground still finer, the minus 325 mesh fractions become higher in iron but coarser fractions become lower in iron so that the gain on the one hand offsets the loss in the other.

The problem, therefore, which has faced the industry with respect to these types of ores is how to segregate these middling particles from the magnetic concentrate so that the same may be re-treated separately and at a low cost, which is an essential requirement for the reason that the resulting product has a very low value even when in condition to be used as a furnace feed.

Numerous attempts have been made in the past by devious methods to secure a concentrate richer in iron and having an acceptable percentage of silica. For example, attempts have been made by use of flotation processes using fatty acids as well as amine reagents to secure segregation of these middlings from the ore concentrate. In the case of the flotation process using fatty acids, for example, considerable trouble has been experienced with slimes, making it necessary to pursue expensive desliming procedures prior to flotation. In this particular case, while the iron content was increased, nevertheless the recovery of total iron was low and the resulting product contained phosphorus in an amount approaching .250%, thus making the concentrate undesirable as a furnace feed.

In the further case of attempts to segregate the silica middlings from the concentrate by the use of amine reagents, it has been found that while a certain degree of separation was effected, nevertheless the silicates were retained by the concentrate, likewise making the treated product commercially undesirable.

The present invention is, therefore, grounded upon and has for an object the idea of overcoming the inherent deficiencies of prior procedures involved in producing a suitable iron ore concentrate from such low grade iron ores and to provide a process which makes it commercially possible to use these low grade iron ores.

More particularly, the present invention is concerned primarily in effecting a commercial concentrate from a magnetic concentrate of unacceptable grade which in turn is secured from an iron ore of low grade having an acceptable percentage of iron and silica.

Other objects, features, capabilities and advantages are comprehended by the invention, as will later appear and as are inherently possessed thereby.

In the drawings which illustrate an embodiment of the invention and wherein like reference characters are used to designate like parts—

Figure 1 is a flow chart illustrating certain procedural steps which are conventional in concentrating crude iron ore containing magnetite;

Figure 2 is a flow chart illustrating certain additional procedural steps comprising the method of the invention;

Figure 3 is a vertical sectional view illustrating a type of hydraulic classifier suitable for carrying out the additional procedural steps of the invention; and Figure 4 is a transverse sectional view through one of the settling chambers of the classifier shown in Figure 3.

In order to more fully appreciate the character and scope of the present invention, reference is hereby made to the flow sheet or chart of Figure 1 which illustrates certain procedural steps which are followed in concentrating crude iron ore containing magnetite. The procedure as illustrated by this flow sheet has been followed by the industry in the past to produce a concentrate from low grade ore assaying from 60 to 62% iron and from 12 to 14% silica. Such a concentrate cannot be used successfully in the industry because of the relatively low percentage of iron and the relatively high percentage of silica.

Such low grade iron concentrates have been further processed or conditioned by finer grinding and subjected to flotation procedures, but it was found that there was no selectivity or differential fractioning of the silica middlings and the remaining ore particles. Other hydraulic processes have been followed but it was found that the resulting concentrate contained only substantially 58.5% iron and that this product represented only from 40 to 50% of the iron in the concentrate used.

It was discovered, however, that new and outstanding results could be secured if the concentrate formed in accordance with the flow sheet of Figure 1 had particle sizes within a certain critical range and was then subjected to the action of a hydraulic classifier in which event the concentrate would precipitate out in the classifier and could be drawn off from the bottom thereof while the silica middlings would be selectively separated therefrom and would be discharged with the overflow from the classifier and could be collected for re-treatment.

Typical concentrates which are further treated by the hydraulic classifier are as follows:

| Mesh Size | Per cent Wt. | Per cent Fe |
|---|---|---|
| −65+100 | .32 | 37.45 |
| +150 | 1.81 | 37.45 |
| +200 | 11.51 | 38.64 |
| +325 | 36.25 | 62.60 |
| −325 | 50.11 | 69.42 |
| | 100.00 | 62.72 |

When such a concentrate is further subjected to the action of the hydraulic classifier, the following product is secured:

| Concentrate | | Overflow | |
|---|---|---|---|
| Per cent Weight | Per cent Fe | Per cent Weight | Per cent Fe |
| 87.48 | 65.92 | 12.52 | 40.35 |

A typical concentrate having a slightly finer grind is represented by the following:

| Mesh Size | Per cent weight | Per cent Fe |
|---|---|---|
| −100+150 | 1.66 | 32.65 |
| +200 | 5.34 | 39.60 |
| +325 | 14.26 | 55.11 |
| −325 | 78.74 | 67.00 |
| | 100.00 | 63.27 |

Subjecting such concentrate to the action of the hydraulic classifier results in the following product:

| Concentrate | | Overflow | |
|---|---|---|---|
| Per cent Weight | Per cent Fe | Per cent Weight | Per cent Fe |
| 88.26 | 65.83 | 11.74 | 44.01 |

In order to secure the best results, it has been found that the particle sizes of the concentrate resulting from the procedure outlined by the flow sheet of Figure 1 should vary from 65 mesh to 325 mesh and in which at least 50% by weight of the concentrate passes through the 325 mesh screen.

The flow sheet of Figure 2 diagrammatically discloses the further treatment of the concentrate produced in accordance with the flow sheet of Figure 1 where the particle sizes are within the critical range as above set forth. The particular classifier used in following the procedure as outlined in the flow sheet shown on Figure 2 is diagrammatically disclosed in Figures 3 and 4 as embodying a container 2 formed with a plurality of partitions 4 extending from adjacent the bottom of the tank and terminating in spaced relation to the top to provide a plurality of sorting columns or compartments 6 intercommunicating with each other adjacent the top of the tank, as at 8. This classifier is further identified as including an overflow 10 adjacent the top thereof for the water which is introduced into the container 2 under pressure through the perforated plates 12 of a plurality of pressure boxes 14 disposed within each of the sorting columns or chambers. The concentrate is introduced through the feed conduit 15 about which may be placed a solenoid 16 through which a direct current is passed to place the concentrate in magnetized condition prior to its introduction into the classifier to produce a flocculated concentrate within the body of fluid contained within said classifier. The feed conduit 15 introduces the magnetized concentrate in the upper regions of the first sorting chamber to the left, as shown in the drawings, and under the action of the water under pressure this concentrate is dispersed and segregated in the several compartments of the classifier. During such treatment, the silica middlings are selectively segregated from the other particles of ore concentrate and are discharged with the overflow from the classifier, as at 18, for re-treatment. The remaining particles of the ore concentrate are precipitated in the lower portion of the sorting chambers and may be removed therefrom from time to time, or continuously, through the spigot discharge openings 20 which may be suitably controlled by valves to regulate the discharge of concentrates in accordance with the operation of the device. While a classifier of a particular type has been herein disclosed, nevertheless the processes as contemplated comprehend the use of any hydraulic classifier operating on the principles herein disclosed.

As an illustration of the results which can be accomplished following the practice above described, the silicious middlings in the overflow comprised less than 10% of the weight of the concentrate fed to the classifier. The concentrate recovered from spigots Nos. 1 and 2 shown in the flow sheet produced an off-grade product representing in the neighborhood of from 10 to 12% of the feed, which product, however, is admirably suited for re-treatment by tables. Concentrate recovered from spigots Nos. 3, 4 and 5, as shown above, assayed about 66% iron, about 6.5% silica and phosphorus around .010% and contained around 87% of the weight of the iron in the feed to the classifier. This is a very acceptable product and either of the concentrates from spigots 3 or 4 is sufficiently low in silica and high in iron as to be suitable for open hearth ore. The remainder of the ore from spigots 3, 4 and 5, when combined, makes a very acceptable blast furnace feed.

The cost of treating this magnetized feed in a hydraulic classifier is very low and the process herein above set forth which has been found effective in treating these low grade iron ore concentrates admirably adapts itself as a continuation of the procedural steps represented by the flow sheet of Figure 1 which has become recognized at the present time as the ultimate in concentrating these low grade ores.

While the specification and drawings designate certain percentages in reference to the concentrates and their component constituents, it is to be understood that these percentages may be varied in accordance with the operation of the hydraulic classifier.

While I have herein described illustrative embodiments of the invention and processes for making the same, it is to be understood that the invention is not limited thereto but may comprehend other details, features and process steps without departing from the spirit of the invention.

What is claimed is:

1. The process of treating low grade magnetic iron ore which consists in producing a concentrate of the same by a process including a magnetic separation step, said concentrate having particle sizes varying from minus 65 mesh with at least 50% by weight thereof passing through a 325 mesh screen, subjecting said concentrate in a magnetized flocculated condition to hydraulic classification in a multiple stage upflow classifier whereby a first and second precipitate is recovered and the low grade fractions overflow with the discharge, said first precipitate comprising an off-grade product which is suitable for retreatment, and the second precipitate comprising a concentrate having an increased iron content and a decreased silica content such as to render the concentrate acceptable as an open hearth or blast furnace feed.

2. The process of treating low grade magnetic iron ore which consists in producing a concentrate of the same by a process including a magnetic separation step, said concentrate having particle sizes varying from minus 65 mesh with at least 50% by weight thereof passing through a 325 mesh screen, causing said concentrate to be magnetized, subjecting said concentrate in a magnetized flocculated condition to hydraulic classification in a multiple stage upflow classifier whereby the silica middlings overflow with the discharge and a precipitate is recovered having a commercially acceptable iron content of about 65% with low silica content.

3. The process of treating low grade magnetic iron ore which consists in producing a concentrate of the same by a process including a magnetic separation step, whereby the concentrate is magnetized and has particle sizes varying from minus 65 mesh with at least 50% by weight thereof passing through a 325 mesh screen, subjecting said concentrate in a magnetized flocculated condition to hydraulic classification in a multiple stage upflow classifier whereby the silica middlings overflow with the discharge and a plurality of precipitates are recovered, certain of said precipitates comprising a concentrate assaying approximately 65% iron and 6.5% silica.

4. The process of treating low grade magnetic iron ore which consists in producing a concentrate of the same by a process including a magnetic separation step, said concentrate assaying approximately 60% iron and from 10-14% silica and having particle sizes varying from minus 65 mesh with at least 50% by weight thereof passing through a 325 mesh screen, subjecting said concentrate in a magnetized flocculated condition to hydraulic classification in a multiple stage upflow classifier whereby the low grade fractions including silica, silicates and middlings overflow with the discharge, and whereby a precipitate is recovered assaying approximately 65% iron and 6.5% silica and being in an amount of at least 85% by weight of the iron in the concentrate delivered to the classifier.

ROBERT W. BRAUND.

REFERENCES CITED

The following references are of record in the file of this patent:

UNITED STATES PATENTS

| Number | Name | Date |
| --- | --- | --- |
| 2,276,075 | Wuensch | Mar. 10, 1942 |

OTHER REFERENCES

"Text Book of Ore Dressing," by Richards and Locke, third edition, published by McGraw-Hill Book Co., New York, 1940, pages 128, 129, 154, 155.

"Magnetic Separation of Ores," by Dean and Davis, Bureau of Mines Bulletin 425, published by U. S. Government Printing Office, Washington, 1940. Copy in Div. 25. Pages 242-246.